(12) United States Patent
Huang

(10) Patent No.: US 8,424,236 B2
(45) Date of Patent: Apr. 23, 2013

(54) MULTI-LAYERED GRIP FOR USE WITH FISHING POLES

(76) Inventor: Ben Huang, Huntington Beach, CA (US)

( * ) Notice: Subject to any disclaimer, the term of this patent is extended or adjusted under 35 U.S.C. 154(b) by 441 days.

(21) Appl. No.: 12/753,773

(22) Filed: Apr. 2, 2010

(65) Prior Publication Data

US 2010/0281754 A1 Nov. 11, 2010

Related U.S. Application Data (60) Provisional application No. 61/177,210, filed on May 11, 2009, provisional application No. 61/183,484, filed on Jun. 2, 2009.

(51) Int. Cl.
*A01K 87/00* (2006.01)
(52) U.S. Cl.
USPC ............................................. 43/23; 43/18.1 R
(58) Field of Classification Search ......... 43/23, 18.1 R, 43/18.5; D22/137, 138
See application file for complete search history.

(56) References Cited

U.S. PATENT DOCUMENTS

| | | | |
|---|---|---|---|
| 571,025 A | 11/1896 | Spamer |
| 834,711 A | 10/1906 | Clarke et al. |
| 979,266 A | 12/1910 | Dean |
| 1,008,604 A | 11/1911 | Lake |
| 1,017,565 A | 2/1912 | Lard |
| 1,139,843 A | 5/1915 | Brown |
| 1,345,505 A | 7/1920 | Persons |
| 1,435,088 A | 11/1922 | Smith |
| 1,480,056 A | 1/1924 | Flint |
| 1,522,635 A | 1/1924 | Kraeuter |
| 1,528,190 A | 3/1925 | Howe |
| 1,617,972 A | 2/1927 | Wallace |
| 1,701,856 A | 2/1929 | Kraeuter |
| 1,890,037 A | 11/1930 | Johnson |
| 1,943,399 A | 1/1934 | Smith |
| 2,000,295 A | 5/1935 | Oldham |
| 2,086,062 A | 7/1937 | Bray |
| 2,103,889 A | 12/1937 | Brisick |
| 2,115,119 A | 4/1938 | Park |
| 2,149,911 A | 3/1939 | East |
| 2,206,056 A | 7/1940 | Sheesley |
| 2,221,421 A | 11/1940 | Curry |
| 2,225,839 A | 12/1940 | Moore |
| 2,449,575 A | 9/1948 | Wilhelm |

(Continued)

FOREIGN PATENT DOCUMENTS

CN 2090283 12/1991
CN 2139008 Y 7/1993

(Continued)

OTHER PUBLICATIONS

European Search Report No. 10250730.8 dated Sepetember 21, 2010.

(Continued)

*Primary Examiner* — Christopher P Ellis
(74) *Attorney, Agent, or Firm* — Knobbe Martens Olson & Bear LLP (57) ABSTRACT

Disclosed are grips and methods of making grips for use with the handle of an article, and in particular for use with fishing poles. The grip preferably includes an ethylene vinyl acetate sleeve member and a gripping member having an outer layer and an inner layer. The inner layer of the gripping member is preferably ethylene vinyl acetate and is preferably bonded or adhered to the sleeve member.

2 Claims, 5 Drawing Sheets

U.S. PATENT DOCUMENTS

| | | |
|---|---|---|
| 2,523,637 A | 9/1950 | Stanfield et al. |
| 2,671,660 A | 3/1954 | Goodwin |
| 2,690,338 A | 9/1954 | Brocke |
| 2,772,090 A | 11/1956 | Brandon |
| 2,934,285 A | 4/1960 | Niehaus |
| 2,984,486 A | 5/1961 | Jones |
| 3,028,283 A | 4/1962 | Lundgren et al. |
| 3,059,816 A | 10/1962 | Goldstein |
| 3,073,055 A | 1/1963 | Edwards et al. |
| 3,087,729 A | 4/1963 | Sullivan |
| 3,095,198 A | 6/1963 | Gasche |
| 3,140,873 A | 7/1964 | Goodwin |
| 3,157,723 A | 11/1964 | Hochberg |
| 3,252,706 A | 5/1966 | Rosasco, Sr. |
| 3,311,375 A | 3/1967 | Onions |
| 3,366,384 A | 1/1968 | Lamkin et al. |
| 3,368,811 A | 2/1968 | Finney |
| 3,503,784 A | 3/1970 | Okayama et al. |
| 3,606,325 A | 9/1971 | Lamkin et al. |
| 3,697,315 A | 10/1972 | Mine |
| 3,857,745 A | 12/1974 | Grausch et al. |
| 3,876,320 A | 4/1975 | Phillipson |
| 3,922,402 A | 11/1975 | Shimamura et al. |
| 3,973,348 A | 8/1976 | Shell |
| 3,992,021 A | 11/1976 | Tobin |
| 4,012,039 A | 3/1977 | Yerke |
| 4,015,851 A | 4/1977 | Pennell |
| 4,052,061 A | 10/1977 | Stewart |
| 4,133,529 A | 1/1979 | Gambino |
| 4,137,360 A | 1/1979 | Reischl |
| 4,216,251 A | 8/1980 | Nishimura et al. |
| 4,284,275 A | 8/1981 | Fletcher |
| 4,347,280 A | 8/1982 | Lau et al. |
| 4,358,499 A | 11/1982 | Hill |
| 4,373,718 A | 2/1983 | Schmidt |
| 4,448,922 A | 5/1984 | McCartney |
| 4,453,332 A | 6/1984 | Wightman |
| 4,535,649 A | 8/1985 | Stahel |
| 4,582,459 A | 4/1986 | Benit |
| 4,613,537 A | 9/1986 | Krüpper |
| 4,651,991 A | 3/1987 | McDuff |
| 4,662,415 A | 5/1987 | Proutt |
| 4,765,856 A | 8/1988 | Doubt |
| 4,878,667 A | 11/1989 | Tosti |
| 4,919,420 A | 4/1990 | Sato |
| 4,941,232 A | 7/1990 | Decker et al. |
| 4,971,837 A | 11/1990 | Martz et al. |
| 5,024,866 A | 6/1991 | Goode |
| 5,055,340 A | 10/1991 | Matsumura et al. |
| 5,118,107 A | 6/1992 | Bucher |
| 5,123,646 A | 6/1992 | Overby et al. |
| 5,127,650 A | 7/1992 | Schneller |
| 5,261,665 A | 11/1993 | Downey |
| 5,322,290 A | 6/1994 | Minami |
| 5,343,776 A | 9/1994 | Falco |
| 5,374,059 A | 12/1994 | Huang |
| 5,396,727 A | 3/1995 | Furuya et al. |
| 5,427,376 A | 6/1995 | Cummings et al. |
| 5,469,601 A | 11/1995 | Jackson |
| 5,474,802 A | 12/1995 | Shimoda et al. |
| 5,480,146 A | 1/1996 | Comer |
| 5,485,996 A | 1/1996 | Niksich |
| 5,511,445 A | 4/1996 | Hildebrandt |
| 5,537,773 A | 7/1996 | Matsubara et al. |
| 5,570,884 A | 11/1996 | Carps |
| 5,571,050 A | 11/1996 | Huang |
| 5,577,722 A | 11/1996 | Glassberg |
| 5,584,482 A | 12/1996 | Huang |
| 5,595,544 A | 1/1997 | Roelke |
| 5,611,533 A | 3/1997 | Williams |
| 5,624,116 A | 4/1997 | Yeh |
| 5,626,527 A | 5/1997 | Eberlein |
| 5,634,859 A | 6/1997 | Nesbitt |
| 5,645,501 A | 7/1997 | Huang |
| 5,671,923 A | 9/1997 | Huang |
| 5,690,566 A | 11/1997 | Bracho |
| 5,695,418 A | 12/1997 | Huang |
| 5,730,662 A | 3/1998 | Rens |
| 5,730,669 A | 3/1998 | Huang |
| 5,753,568 A | 5/1998 | Shimano et al. |
| 5,772,524 A | 6/1998 | Huang |
| 5,781,963 A | 7/1998 | Maru et al. |
| 5,797,813 A | 8/1998 | Huang |
| 5,803,828 A | 9/1998 | Huang |
| 5,813,921 A | 9/1998 | Huang |
| 5,816,933 A | 10/1998 | Huang |
| 5,816,934 A | 10/1998 | Huang |
| 5,827,129 A | 10/1998 | Huang |
| 5,839,983 A | 11/1998 | Kramer |
| 5,851,632 A | 12/1998 | Chen et al. |
| 5,857,929 A | 1/1999 | Huang |
| 5,867,868 A | 2/1999 | Ward |
| 5,890,260 A | 4/1999 | Gaunt |
| 5,890,972 A | 4/1999 | Huang |
| 5,895,329 A | 4/1999 | Huang |
| 5,910,054 A | 6/1999 | Huang |
| 5,924,941 A | 7/1999 | Hagey |
| 5,997,421 A | 12/1999 | Huang |
| 6,036,607 A | 3/2000 | Finegan |
| 6,048,275 A | 4/2000 | Gedeon |
| 6,148,482 A | 11/2000 | Maraman, Jr. |
| 6,197,392 B1 | 3/2001 | Jones |
| 6,226,836 B1 | 5/2001 | Yasui |
| 6,244,975 B1 | 6/2001 | Huang |
| 6,261,191 B1 | 7/2001 | Chen |
| 6,314,617 B1 | 11/2001 | Hastings |
| 6,360,475 B1 | 3/2002 | Lepage et al. |
| 6,361,450 B1 | 3/2002 | Huang |
| 6,386,989 B1 | 5/2002 | Huang |
| D463,520 S | 9/2002 | Ulrich |
| 6,449,803 B1 | 9/2002 | McConchie |
| 6,503,153 B2 | 1/2003 | Wang |
| 6,506,128 B1 | 1/2003 | Bloom, Jr. |
| 6,511,732 B1 | 1/2003 | Chao |
| 6,551,198 B2 | 4/2003 | Huang |
| 6,558,270 B2 | 5/2003 | Kwitek |
| 6,627,027 B2 | 9/2003 | Huang |
| 6,629,382 B2 | 10/2003 | Irrgang et al. |
| 6,629,901 B2 | 10/2003 | Huang |
| 6,635,688 B2 | 10/2003 | Simpson |
| 6,652,398 B2 | 11/2003 | Falone et al. |
| 6,656,054 B2 | 12/2003 | Ulrich |
| 6,656,057 B2 | 12/2003 | Manual et al. |
| 6,663,500 B2 | 12/2003 | Huang |
| 6,666,777 B1 | 12/2003 | Falone et al. |
| 6,676,534 B2 | 1/2004 | Huang |
| 6,695,713 B2 | 2/2004 | Huang |
| 6,709,346 B1 | 3/2004 | Wang |
| 6,733,401 B1 | 5/2004 | Huang |
| 6,762,243 B2 | 7/2004 | Stender et al. |
| 6,827,656 B1 | 12/2004 | Hoeflich et al. |
| 6,843,732 B1 | 1/2005 | Huang |
| 6,857,971 B2 | 2/2005 | Huang |
| 6,908,400 B2 | 6/2005 | Chu et al. |
| 6,973,750 B1 | 12/2005 | Kim |
| 6,974,626 B2 | 12/2005 | Horacek |
| 7,008,582 B2 | 3/2006 | Chen |
| 7,025,690 B2 | 4/2006 | Nam |
| 7,048,644 B2 | 5/2006 | Wang |
| 7,137,904 B2 | 11/2006 | Huang |
| 7,140,973 B2 | 11/2006 | Rohrer |
| D534,602 S | 1/2007 | Norton et al. |
| D534,603 S | 1/2007 | Norton et al. |
| D534,604 S | 1/2007 | Norton et al. |
| D534,605 S | 1/2007 | Norton et al. |
| D534,607 S | 1/2007 | Norton et al. |
| D534,975 S | 1/2007 | Norton et al. |
| D536,048 S | 1/2007 | Chen |
| D538,868 S | 3/2007 | Norton et al. |
| D538,869 S | 3/2007 | Wang et al. |
| 7,186,189 B2 | 3/2007 | Huang |
| 7,195,568 B2 | 3/2007 | Huang |
| 7,219,395 B2 | 5/2007 | Bigolin |
| 7,344,447 B2 | 3/2008 | Chang |
| 7,344,448 B2 | 3/2008 | Huang |
| 7,347,792 B2 | 3/2008 | Huang |
| 7,374,498 B2 | 5/2008 | Huang |

| | | |
|---|---|---|
| 7,404,770 B2 | 7/2008 | Huang |
| 7,438,646 B2 | 10/2008 | Huang |
| 7,448,957 B2 | 11/2008 | Huang |
| 7,448,958 B2 | 11/2008 | Huang |
| 7,458,903 B2 | 12/2008 | Wang et al. |
| 7,470,199 B2 | 12/2008 | Huang |
| 7,491,133 B2 | 2/2009 | Huang |
| 7,527,564 B2 | 5/2009 | Huang |
| 7,566,375 B2 | 7/2009 | Huang |
| 7,585,230 B2 | 9/2009 | Huang |
| 7,770,321 B2 | 8/2010 | Huang |
| 2002/0028325 A1 | 3/2002 | Simpson |
| 2002/0142858 A1 | 10/2002 | Chen |
| 2002/0142900 A1 | 10/2002 | Wang |
| 2002/0151373 A1 | 10/2002 | Beauregard |
| 2002/0173371 A1 | 11/2002 | Lamkin et al. |
| 2003/0040384 A1 | 2/2003 | Falone et al. |
| 2003/0045370 A1 | 3/2003 | Jaw |
| 2003/0062654 A1 | 4/2003 | Lamkin |
| 2003/0139223 A1 | 7/2003 | Ulrich et al. |
| 2003/0148836 A1 | 8/2003 | Falone et al. |
| 2003/0150081 A1 | 8/2003 | Wang |
| 2003/0216192 A1 | 11/2003 | Chu |
| 2003/0228930 A1 | 12/2003 | Huang |
| 2004/0029645 A1 | 2/2004 | Chen |
| 2004/0029646 A1 | 2/2004 | Chu et al. |
| 2004/0031128 A1 | 2/2004 | Chen |
| 2004/0109980 A1 | 6/2004 | Chen et al. |
| 2004/0123429 A1 | 7/2004 | Wang |
| 2004/0185958 A1 | 9/2004 | Huang |
| 2004/0248664 A1 | 12/2004 | Billings |
| 2005/0123723 A1 | 6/2005 | Wang |
| 2005/0229285 A1 | 10/2005 | Chung |
| 2005/0276925 A1 | 12/2005 | Su |
| 2005/0287329 A1 | 12/2005 | Lai |
| 2006/0172815 A1 | 8/2006 | Chu |
| 2006/0252571 A1 | 11/2006 | Wang |
| 2006/0287123 A1 | 12/2006 | Wang |
| 2007/0149307 A1 | 6/2007 | Huang |
| 2008/0039226 A1 | 2/2008 | Chi |
| 2008/0120893 A1 | 5/2008 | Keys et al. |
| 2008/0172839 A1 | 7/2008 | Wang |

FOREIGN PATENT DOCUMENTS

| | | |
|---|---|---|
| CN | 2163667 Y | 5/1994 |
| CN | 2288744 | 8/1998 |
| CN | 1332022 A | 7/2000 |
| CN | 2438768 | 7/2001 |
| CN | 2444645 | 8/2001 |
| CN | 02254450.X | 9/2002 |
| CN | 2596752 Y | 1/2004 |
| CN | 2659497 Y | 12/2004 |
| DE | 36 44 674 A1 | 7/1988 |
| DE | 92 18 550 U1 | 8/1994 |
| FR | 2 731 402 A3 | 9/1996 |
| GB | 2 192 550 A | 1/1988 |
| JP | 53-12061 | 2/1978 |
| JP | 55-43008 | 3/1980 |
| JP | 60-61067 | 4/1985 |
| JP | 3112575 | 5/1991 |
| JP | 7-41731 | 2/1995 |
| JP | 3076015 | 12/2000 |
| JP | 3081404 | 8/2001 |
| JP | 2002-028264 | 1/2002 |

OTHER PUBLICATIONS

U.S. Appl. No. 10/167,216, filed Jun. 11, 2002, now U.S. Patent No. 7,137,904, issued Nov. 21, 2006.
U.S. Appl. No. 10/348,389, filed Jan. 21, 2003, now U.S. Patent No. 6,733,401, issued May 11, 2004.
U.S. Appl. No. 10/392,480, filed Mar. 18, 2003, now U.S. Patent No. 6,857,971, issued Feb. 22, 2005.
U.S. Appl. No. 10/746,764, filed Dec. 23, 2003, now U.S. Patent No. 6,843,732, issued Jan. 18, 2005.
U.S. Appl. No. 10/785,379, filed Feb. 24, 2004, now U.S. Patent No. 7,374,498, issued May 20, 2008.
U.S. Appl. No. 10/827,095, filed Apr. 19, 2004, now U.S. Patent No. 7,195,568, issued Mar. 27, 2007.
U.S. Appl. No. 10/875,035, filed Jun. 23, 2004, now U.S. Patent No. 7,585,230, issued Sep. 8, 2009.
U.S. Appl. No. 11/062,046, filed Feb. 18, 2005, now U.S. Patent No. 7,470,199, issued Dec. 30, 2008.
U.S. Appl. No. 11/131,832, filed May 18, 2005, now U.S. Patent No. 7,527,564, issued May 5, 2009.
U.S. Appl. No. 11/172,770, filed Jul. 1, 2005, now U.S. Patent No. 7,186,189, issued Mar. 6, 2007.
U.S. Appl. No. 11/412,196, filed Apr. 25, 2006, (U.S. Pub. No. 2006-0264268 A1), abandoned.
U.S. Appl. No. 11/416,364, filed May 1, 2006, now U.S. Patent No. 7,438,646, issued Oct. 21, 2008.
U.S. Appl. No. 12/425,187, filed Apr. 16, 2009, (U.S. Pub. No. 2009-0258722 A1), abandoned.
U.S. Appl. No. 11/413,411, filed Apr. 28, 2006, now U.S. Patent No. 7,344,448, issued Mar. 18, 2008.
U.S. Appl. No. 11/438,808, filed May 22, 2006, now U.S. Patent No. 7,347,792, issued Mar. 25, 2008.
U.S. Appl. No. 11/417,643, filed May 3, 2006, now U.S. Patent No. 7,448,957, issued Nov. 11, 2008.
U.S. Appl. No. 11/417,623, filed May 3, 2006, now U.S. Patent No. 7,566,375, issued Jul. 28, 2009.
U.S. Appl. No. 11/417,555, filed May 3, 2006, now U.S. Patent No. 7,404,770, issued Jul. 29, 2008.
U.S. Appl. No. 11/417,401, filed May 3, 2006, now U.S. Patent No. 7,491,133, issued Feb. 17, 2009.
U.S. Appl. No. 11/682,264, filed Mar. 5, 2007, (U.S. Pub. No. 2007-0149307 A1), pending.
U.S. Appl. No. 11/417,696, filed Mar. 5, 2006, now U.S. Patent No. 7,448,958, issued Nov. 11, 2008.
U.S. Appl. No. 12/045,639, filed Mar. 10, 2008, (U.S. Pub. No. 2008-0229646 A1), pending.
U.S. Appl. No. 11/689,452, filed Mar. 21, 2007, (U.S. Pub. No. 2008-0230174 A1), pending.
U.S. Appl. No. 12/123,384, filed May 19, 2008, (U.S. Pub. No. 2008-0283178 A1), pending.
U.S. Appl. No. 11/838,670, filed Aug. 14, 2007, (U.S. Pub. No. 2009-0048036 A1), pending.
U.S. Appl. No. 12/055,289, filed Mar. 25, 2008, (U.S. Pub. No. 2009-0025852 A1), pending.
U.S. Appl. No. 12/426,896, filed Apr. 20, 2009, (U.S. Pub. No. 2009-0258721 A1), pending.
A. Zosel, Adhession and tack of polymers: Influence of mechanical properties and surface tension, Colloid & Polymer Science 263:541-553 (1985) in 13 pages.
U.S. Appl. No. 09/901,747, filed Jul. 9, 2001, (U.S. Pub. No. 2001/0046905), abandoned.
Design U.S. Appl. No. 29/436,610, filed Nov. 7, 2012, pending.

MULTI-LAYERED GRIP FOR USE WITH FISHING POLES

PRIORITY CLAIM

The present application claims the benefit of U.S. Provisional Patent Application No. 61/177,210, filed May 11, 2009 (entitled "MULTI-LAYERED GRIP FOR USE WITH FISHING POLES") and U.S. Provisional Patent Application No. 61/183,484, filed Jun. 2, 2009 (entitled "MULTI-LAYERED GRIP FOR USE WITH FISHING POLES"), the disclosures of each being hereby incorporated by reference in their entireties.

BACKGROUND OF THE INVENTION

1. Field of the Invention

Embodiments of the invention relate to an improved grip for use with the handle portion of articles, in particular, the handle portion of fishing poles.

2. Description of the Related Art

Though grips have been developed, there remains a need for an improved grip.

SUMMARY OF THE INVENTION

Some embodiments provide a grip configured for use with at least a portion of the handle portion of an article, the grip comprising an ethylene vinyl acetate sleeve including a first end, a second end, and a mounting surface extending generally therebetween and a gripping member. In some embodiments, the gripping member comprises an ethylene vinyl acetate inner layer and an outer layer comprising polyurethane, the inner layer of the gripping member being adhered to the mounting surface of the sleeve. In some embodiments, the article is a fishing pole.

Some embodiments provide a method of manufacturing a sleeve for use with a grip, the method comprising the steps of injection molding a primary form of the sleeve in a first mold, the primary form of the sleeve comprising ethylene vinyl acetate. In some embodiments, the injection molded primary form of the sleeve is then removed from the first mold and a core bar is inserted into the inner cavity of the primary form of the sleeve. In some embodiments, the core bar and the primary form of the sleeve are inserted into additional tooling machinery to allow for control of the temperature and time spent at the one or more temperatures to control the coagulation of the ethylene vinyl acetate such that the finished ethylene vinyl acetate as at least approximately one half as dense as the ethylene vinyl acetate injected into the primary form.

Some embodiments provide a grip configured for use with at least a portion of the handle portion of an article which includes an ethylene vinyl acetate sleeve including a first end, a second end, and a mounting surface extending generally therebetween and a gripping member. In some embodiments, the gripping member includes an ethylene vinyl acetate inner layer and an outer layer comprising polyurethane, the inner layer of the gripping member is adhered to the mounting surface of the sleeve, and wherein the ratio of the weight of the sleeve to the weight of the gripping member is less than or equal to approximately 3. In some embodiments, the article is a fishing pole.

Embodiments of the present invention include one or more advantages including offering great feel by transmitting sensitive vibrations to the hand of a user and being light in weight and of low density. In the context of fishing pole grips, the low density and extremely light weight allows the grip to float in water regardless of how wet it becomes.

BRIEF DESCRIPTION OF THE DRAWINGS

Further objects, features and advantages of the inventions will become apparent from the following detailed description taken in conjunction with the accompanying figures showing illustrative embodiments of the invention, in which.

While the invention will now be described in detail with reference to the figures, it is done so in connection with the illustrative embodiments. It is intended that changes and modifications can be made to the described embodiments without departing from the true scope and spirit of the invention.

DETAILED DESCRIPTION OF THE PREFERRED EMBODIMENT

Figures 1, 2:
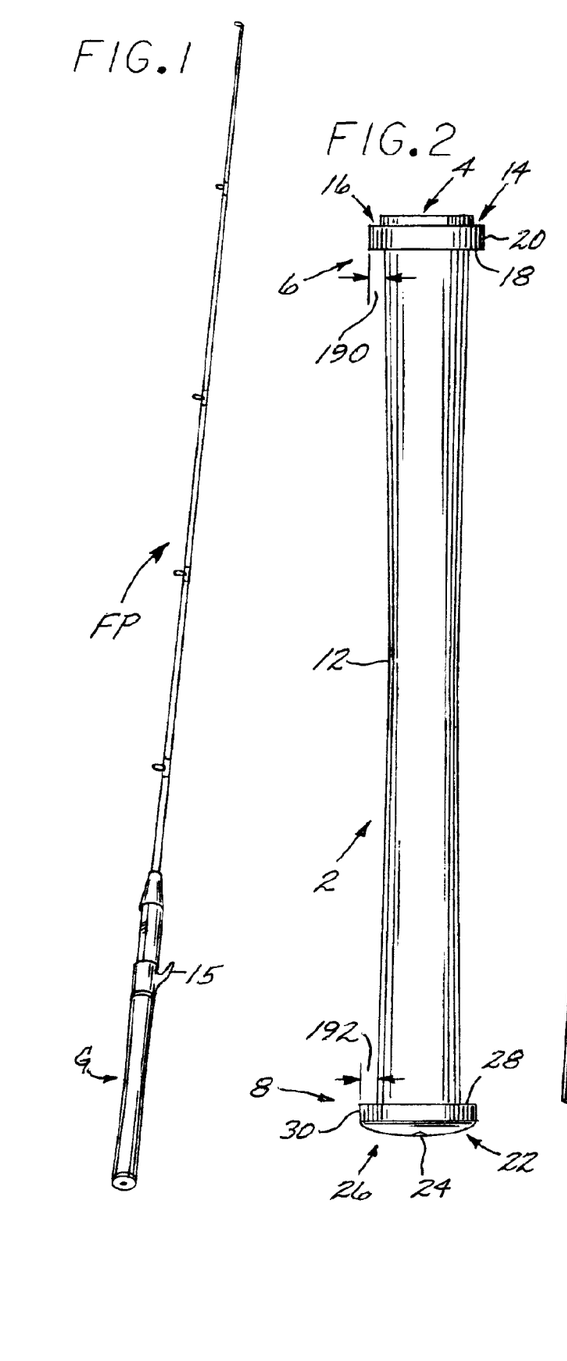
FIG. 1 is a perspective view of an exemplary fishing pole incorporating a grip according to some embodiments.
FIG. 2 is a front view of a grip component according to some embodiments.
Figure 3:
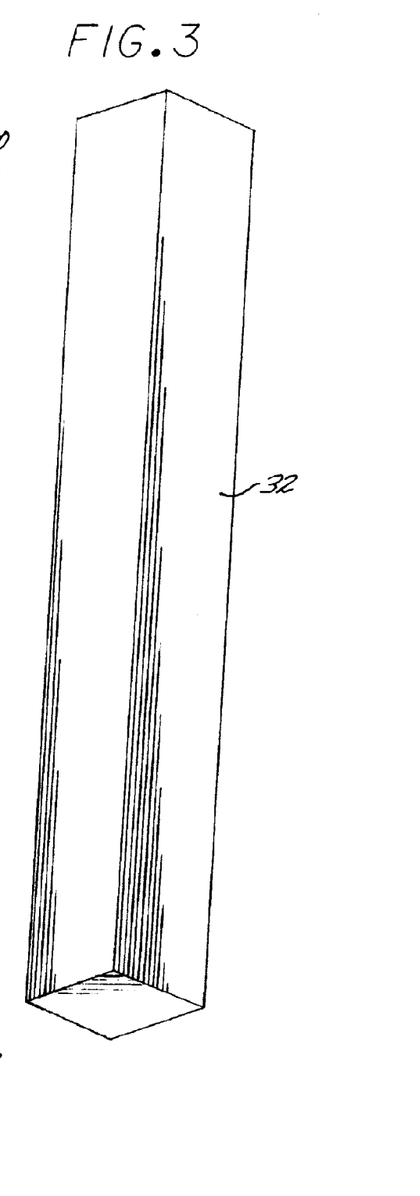
FIG. 3 is a perspective view of a block of material for use in making the component shown in FIG. 2 according to some embodiments.
Figure 4:
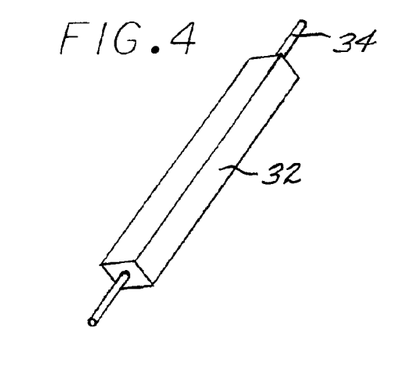
FIG. 4 is a perspective view of the block shown in FIG. 3 on a mount for use during the manufacturing process of a grip component according to some embodiments.

FIG. 1 is a perspective view of a fishing pole FP incorporating a grip G according to some embodiments.

FIG. 2 is a front view of an underlisting sleeve member 2 or sleeve according to some embodiments. The sleeve 2 includes a cavity 4 configured to receive at least a portion of the handle portion of a fishing pole, rod, or other article. In the illustrated embodiment, the sleeve 2 further includes a first end 6 with an opening 10 adapted to receive the handle portion and a second end 8 including a substantially enclosed closed end. A mounting surface 12 or body extends between the first and second ends 6, 8.

As shown, in some embodiments the first end 6 may include a nipple 14, which can be a stepped structure configured to accommodate a finger hook 15 of a fishing rod FP. Alternatively, in some embodiments the nipple 14 may be tapered to provide a smoother transition from the smaller diameter exposed handle, rod, or shaft near the nipple 14 to the main gripping portion 50 of the grip G. The nipple 14 may be integrally formed with the mounting surface 12 or may be separately formed and later joined to the mounting surface 12. As shown, in some embodiments, the nipple 14 may define a circumferential nipple ledge 16 extending around the sleeve member 2 and extending radially outward from the mounting surface 12 of the sleeve member 2 adjacent the mounting surface 12. The nipple ledge 16 may comprise a nipple contact surface 18 and a nipple outer surface 20. The nipple outer surface 20 may transition into the tapered upper portion of the nipple 14.

As shown, in some embodiments the second end 8 may include a cap structure 22. The cap 22 may include an opening 24 to facilitate the escape of air as a handle is inserted into the sleeve 2. The cap 22 may define a generally convex shape on its end. In some embodiments, the cap 22 defines a circumferential cap ledge 26 extending around the sleeve member 2 and extending radially outward from the mounting surface 12 of the sleeve member 2 adjacent the mounting surface 12. The cap ledge 26 comprises a cap contact surface 28 and a cap outer surface 30.

In the illustrated embodiment, the cap 22 and nipple 14 are integrally formed with the body 12 of the sleeve 2. The nipple contact surface 18 extends radially from the mounting surface 12 at approximately 90 degrees. In some embodiments, the nipple contact surface 18 extends from the mounting surface 12 between approximately 45 and approximately 90 degrees. In some embodiments, the nipple contact surface 18 extends from the mounting surface 12 between approximately 90 and approximately 135 degrees. The cap contact surface 28 extends radially from the mounting surface 12 at approximately 90 degrees. In some embodiments, the cap contact surface 28 extends from the mounting surface 12 between approximately 45 and approximately 90 degrees. In some embodiments, the cap contact surface 28 extends from the mounting surface 12 between approximately 90 and approximately 135 degrees.

Figure 5:
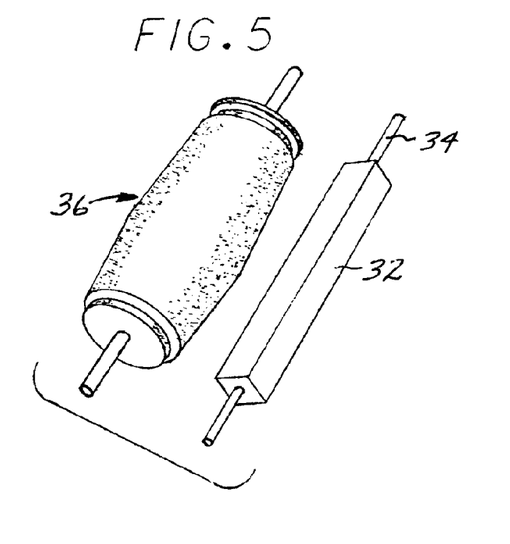
FIG. 5 is a perspective view of the mounted block shown in FIG. 4 with a grinding wheel for use during the manufacturing process of a grip component according to some embodiments.
Figure 6:
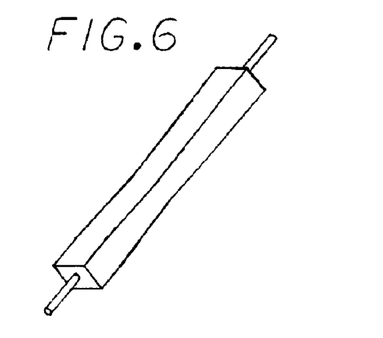
FIG. 6 is a perspective view of a partially shaped grip component according to some embodiments.
Figure 7:
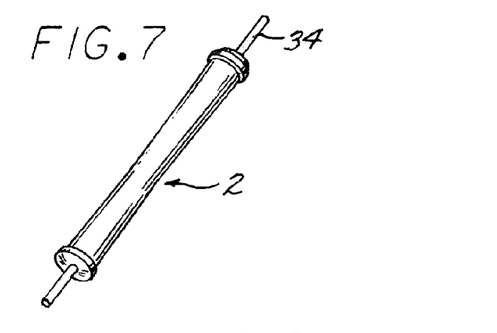
FIG. 7 is a perspective view of a shaped grip component according to some embodiments.

FIGS. 3-9 illustrate a method of manufacturing a sleeve 2 according to some embodiments. In some embodiments, a block 32 of ethylene-vinyl-acetate (EVA) (FIG. 3) is mounted on a support rod 34 (FIG. 4) to facilitate a grinding process. As shown in FIG. 5, a grinder 36 desirably shaped to impart a desired configuration is brought into contact with the block 32 of EVA. As the block 32 makes contact with the grinder 36, the general shape of the grip component is formed. The same grinder that forms the mounting surface 12 or body of the sleeve 2 may also shape the nipple 14 and/or cap 22 if so included. Alternatively, these portions of the grip G may be formed by one or more additional grinders of appropriate shape.

Figure 8:
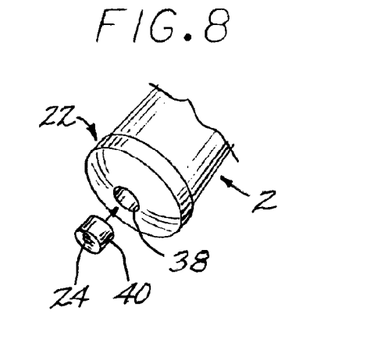
FIG. 8 is a perspective view of an end of the grip component shown in FIG. 7 after the mount is removed and before an end filler is applied according to some embodiments.
Figure 9:
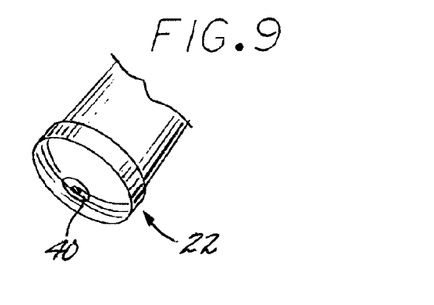
FIG. 9 is a perspective view of the end shown in FIG. 8 after the end filler is applied according to some embodiments.

In some embodiments, once the shape of the sleeve 2 is completed, the mounting rod 34 is preferably removed. In some embodiments, the mounting rod 34 has an external diameter generally equal to the external diameter of the handle portion of an article intended to be inserted into the sleeve 2. The hole 38 left at the second end 8 can be filled with an appropriately shaped plug 40. In some embodiments, the plug 40 is made from the same material as the sleeve 2 so as to seamlessly or virtually seamlessly blend in with the sleeve 2. Alternatively, the plug 40 may be a different material to facilitate the placement of aesthetically pleasing designs, or contrasting colors or textures at the second end 8 of the sleeve 2. Preferably, in some embodiments, the plug 40 includes a small hole 24 or opening to permit the release of air or other fluid as described above.

Figures 10, 12, 12A:
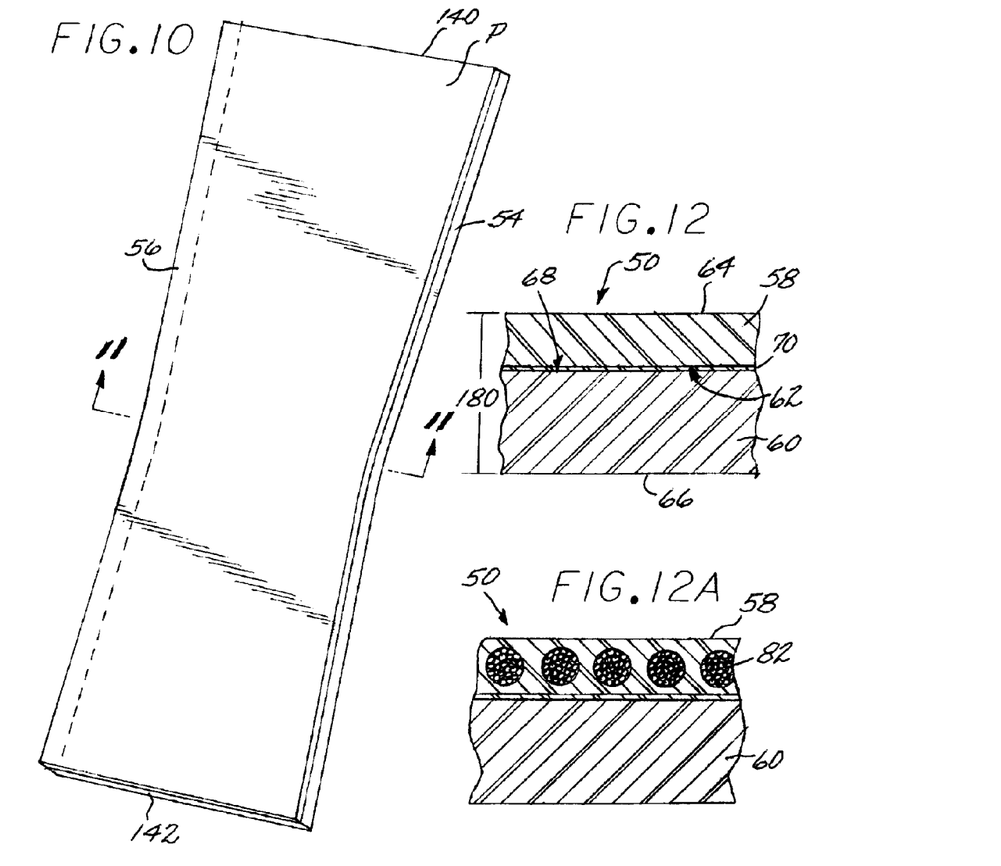
FIG. 10 is a perspective view of a gripping member configured for use with the grip component shown in FIG. 2 according to some embodiments.
FIG. 12 is an enlarged view of a portion of the gripping member designated by the circle 12 in FIG. 11.
FIG. 12A is an alternative view of the portion shown in FIG. 12 according to some embodiments.
Figure 11:
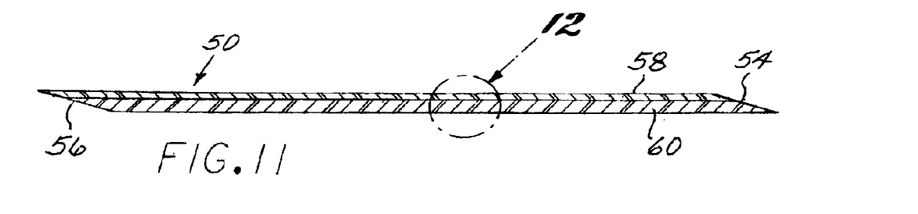
FIG. 11 is a section view of the gripping member shown in FIG. 10 taken along the line 11-11 in FIG. 10.
Figure 14:
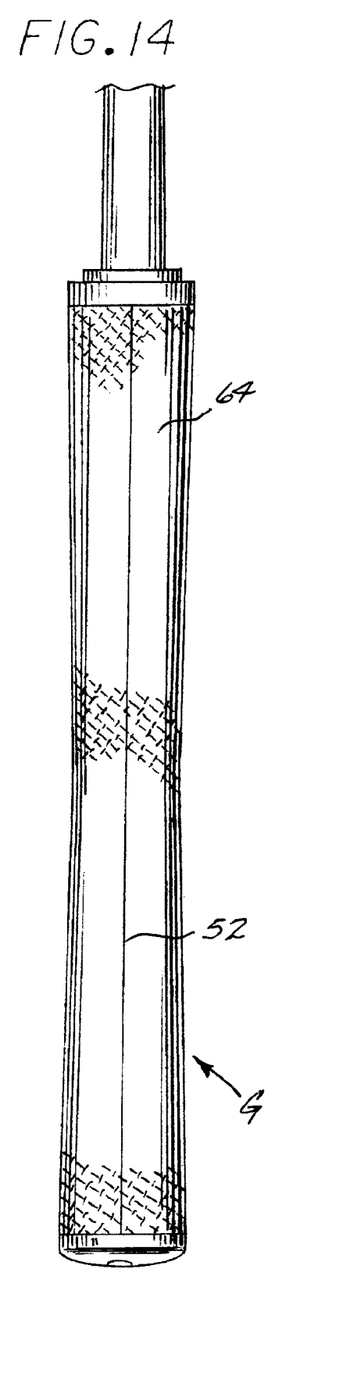
FIG. 14 is a completed grip according to some embodiments.

FIGS. 10-11 illustrate a gripping member 50 according to some embodiments. The gripping member 50 is shaped to generally correspond with the mounting surface 12 of the sleeve 2 when applied thereto. Shown as a panel P, the illustrated embodiment is folded or wrapped around the mounting surface 12 to form a substantially vertical seam 52 (FIG. 14) that joins the side edges 54, 56 of the panel P as described in greater detail below. Alternatively, the gripping member 50 could be formed as a strip that would in turn be spirally wrapped around the mounting surface 12. In some embodiments, multiple panels and/or strips may be incorporated.

FIG. 11 is a section view of the gripping member 50 taken along the line 11-11 in FIG. 10. In some embodiments, the gripping member 50 preferably includes an outer layer 58 adhered, bonded, glued or otherwise attached to a base or inner layer 60. The outer layer 58 defines an inner surface 62 and an outer surface 64 and is preferably polyurethane, though suitable other materials may be used. Similarly, the inner layer 60 defines an inner surface 66 and an outer surface 68 and is preferably a polymeric material, for example ethylene vinyl acetate. In some embodiments, a spray on adhesive 70 is applied to one or both of the inner surface 62 of the outer layer 58 and/or the outer surface 68 of the inner layer 60. Suitable EVA sheets are available from the Ho Ya Electric Bond Factory, Xin Xing Ind. Area. Xin Feng W. Rd., Shi Jie Town Dong Guan City, Guan Dong, Province, China. In some embodiments, the EVA sheet 60 includes an adhesive 70 that is covered with a protective sheet (not shown). The sheet is removed prior to bringing the EVA sheet 60 into contact with the bottom side 62 of the polyurethane sheet 58. Alternatively, adhesive 70 can be sprayed or otherwise applied to one or both of the bottom side 62 of the polyurethane sheet 58 and/or the EVA sheet 60.

FIG. 12 is an enlarged view of a portion of the gripping member 50 designated by the circle 12 in FIG. 11. As mentioned above, the outer layer 58 preferably includes polyurethane. The polyurethane is preferably coagulated to form one or more closed cells (not shown).

Many embodiments of the present invention provide a lightweight grip G with sufficient torsion resistance and shock transmission for use with a variety of articles including fishing poles. In some embodiments, a finished grip including a polyurethane/EVA gripping member 50 adhered to an EVA sleeve 2 weighs between approximately 8 and 35 grams. In some embodiments, the finished grip G weighs between approximately 10 and 25 grams. In some embodiments, the finished grip G weighs between approximately 12 and 22 grams. In a preferred embodiment, the finished grip G weighs approximately 20 grams while still providing the desired shock transmission, tackiness and torsion resistance required of a grip for an article such as a fishing pole.

FIG. 12A is an alternative view of the portion shown in FIG. 12 according to some embodiments. In this embodiment, an additional woven fabric mesh 82 is included in the polyurethane layer 58 during the manufacturing process. For example, if a wet coagulation process is used, the woven fabric mesh 82 can be stitched or otherwise joined to the backing layer (not shown) upon which the polyurethane sheet 58 is to be coagulated. In some embodiments, the backing layer is nylon or another cloth with holes to permit fluid to escape from the coagulating polyurethane. The cloth permits the polyurethane to be removed prior to being included in a grip. The fabric mesh 82 becomes imbedded in the polyurethane and stays with the polyurethane after the backing layer is removed.

Figure 13:
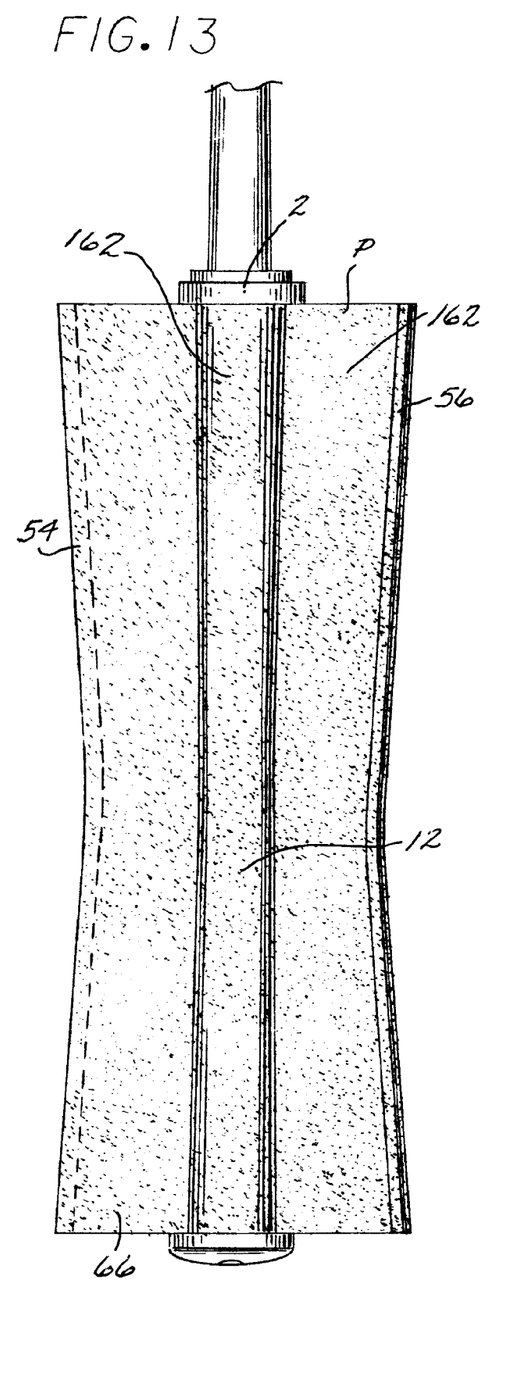
FIG. 13 is a front view of a grip component and a gripping member during the manufacturing process according to some embodiments.

In some embodiments, the fabric mesh 82 includes longitudinally extending fibers (fibers that extend generally along the length of the long axis of a grip for a grip formed by a panel (FIG. 13) or along the long axis of a strip where the finished grip is formed from a spirally wrapped strip) and transversely extending fibers. In some embodiments, the longitudinally extending fibers will preferably be of a larger diameter than the transversely extending fibers. For example, the longitudinal fibers may have a diameter between approximately 0.4 and 0.75 millimeters and the transverse fibers may have a diameter between approximately 0.25 and 0.5 millimeters. In some embodiments, the longitudinal and transverse fibers may be of substantially equal diameters. The woven fabric mesh 82 may be fabricated of suitable materials such as nylon, cotton, polyester, or the like.

Figures 15, 16, 17, 17A:
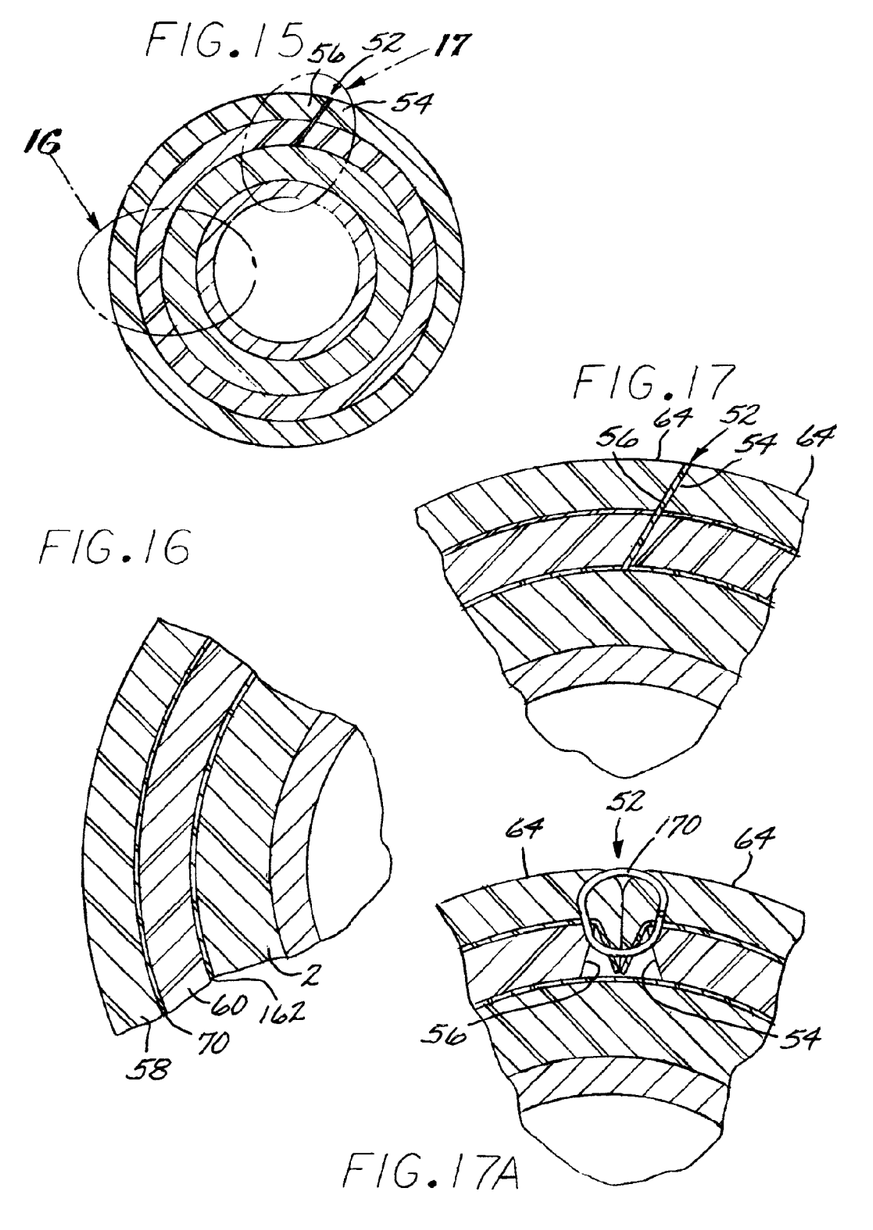
FIG. 15 is a section view of the grip shown in FIG. 14 taken along the line 15-15 in FIG. 14.
FIG. 16 is an enlarged view of a portion of the grip shown in FIG. 14 designated by the circle 16 in FIG. 15 according to some embodiments.
FIG. 17 is an enlarged view of a portion of the grip shown in FIG. 14 designated by the circle 17 in FIG. 15 according to some embodiments.
FIG. 17A is an enlarged view of an alternative configuration of the portion of the grip designated by the circle 17 in FIG. 15 according to some embodiments.

FIGS. 13-17A show the application of a gripping member 50 or panel onto a sleeve 2 according to some embodiments. An adhesive 162 is sprayed onto the mounting surface 12 of the sleeve 2, the inner surface 66 of the gripping member 50 or both as shown and the panel P is wrapped around the mounting surface 12. In some embodiments, the side edges 54, 56 of the panel can be skived so as to overlap along the seam 52 with like layers generally contacting and adhered to like layers as shown in FIGS. 15 and 17. Alternatively, the side edges 54, 56 can be skived such that the outer surface 64 of the panel P at or near the side edges 54, 56 contact each other along the seam 52. In some embodiments, such a seam 52 is stitched closed with the stitches 170 preferably extending through at least a portion of the polyurethane outer layer 58 and at least a portion of the EVA inner layer 60 as shown in FIG. 17A. In some embodiments, the panel P is stitched inside out with the polyurethane surface 64 facing inwards and, after stitching the seam 52, the panel P is reversed as it is applied to the sleeve 2 such that, on the finished grip G, the polyurethane surface 64 is outward facing.

In some embodiments, the thickness 180 of the panel P (FIG. 12) corresponds generally to the distance 190 the nipple contact surface 18 extends from the mounting surface 12 to facilitate the creation of a smooth transition from the gripping member 50 to the nipple 14. In some embodiments, the thickness 180 of the panel P corresponds generally to the distance 192 the cap contact surface 28 extends from the mounting surface 12 to facilitate the creation of a smooth transition from the gripping member 50 to the cap 22.

In some embodiments, the EVA sleeve 2 is injection molded rather than ground down from a block 32 of EVA foam. Ethylene vinyl acetate copolymers possess many excellent characteristics such as low weight, low density, flexibility, transparency, non-toxicity and good resistance to environmental stress cracking, etc. Some embodiments of the present invention overcome the difficulties of working with injection molded EVA. For example, EVA coagulation is a relatively slow process. After injection molding a rough EVA sleeve, a core bar can be inserted inside the sleeve and the sleeve can be transferred to an appropriate mold to control the shape of the finished product. Controlling temperature and time facilitates effective control of the EVA coagulation. In some embodiments, the density of the EVA injected to form the sleeve 2 is less than approximately 1 $g/cm^3$. In some embodiments, the density is between approximately 0.9 and 1 $g/cm^3$. In a preferred embodiment, the density is between approximately 0.930 and 0.943 $g/cm^3$. Controlling the degree of coagulation of the EVA allows embodiments of the invention to include an EVA sleeve whose volume is, for example, approximately doubled or tripled from the original volume. Therefore, in some embodiments, the density of the finished sleeve 2 can be approximately one half or one third of the original density. In some embodiments, the density of the finished sleeve 2 can be between approximately 0.25 and 0.75 $g/cm^3$. In some embodiments, the density of the finished sleeve 2 can be between approximately 0.3 and 0.6 $g/cm^3$.

As described above, many embodiments of the present invention provide a lightweight grip with sufficient torsion resistance and shock transmission for use with a variety of articles including fishing poles. In some embodiments, the weight of the finished sleeve 2 can be between approximately 5 and 15 g. In some embodiments, the weight of the finished sleeve 2 can be between approximately 7 and 12 g. In a preferred embodiment, the finished sleeve 2 weighs approximately 10 g. In some embodiments, the ratio of the weight of the EVA sleeve 2 to the gripping member 50 is between approximately 0.5 and 3. In some embodiments, the ratio is between approximately 0.75 and 2. In a preferred embodiment, the ratio is approximately 1. In some embodiments, the ratio of the weight of the EVA sleeve 2 to the gripping member 50 is less than approximately 3, less than approximately 2.5, less than approximately 2, less than approximately 1.5, less than approximately 1, and/or less than approximately 0.5. In some embodiments, the ratio of the weight of the sleeve 2 to the gripping member 50 in the finished grip G is less than approximately 3 and the overall weight of the finished grip G is between approximately 8 and 35 grams. In a preferred embodiment, the ratio of the weight of the sleeve 2 to the gripping member 50 in the finished grip G is less than approximately 2 and the overall weight of the finished grip G is between approximately 10 and 18 grams.

The invention has been described in terms of certain preferred embodiments. One or more aspects of each of the embodiments can be combined with one or more aspects of other embodiments and such combinations are specifically contemplated herein. Further, general modifications of the disclosure are also contemplated.

What is claimed is:

1. A method of manufacturing a sleeve for use with a grip, the method comprising the steps of:
    injection molding a primary form of the sleeve in a first mold, the primary form of the sleeve comprising ethylene vinyl acetate;
    removing the injection molded primary form of the sleeve from the first mold;
    inserting a core bar into the inner cavity of the primary form of the sleeve;
    inserting the core bar and the primary form of the sleeve into additional tooling machinery to allow for the control of the temperature and the time spent at the one or more temperatures to control the coagulation of the ethylene vinyl acetate such that the finished ethylene vinyl acetate is no more than approximately one half as dense as the ethylene vinyl acetate injected into the primary form.

2. The method of claim 1, wherein the step of coagulating the ethylene vinyl acetate is controlled such that the finished ethylene vinyl acetate is approximately one third as dense as the ethylene vinyl acetate injected into the primary form.

\* \* \* \* \*

UNITED STATES PATENT AND TRADEMARK OFFICE
CERTIFICATE OF CORRECTION

PATENT NO. : 8,424,236 B2  
APPLICATION NO. : 12/753773  
DATED : April 23, 2013  
INVENTOR(S) : Ben Huang Page 1 of 1

It is certified that error appears in the above-identified patent and that said Letters Patent is hereby corrected as shown below:

On the Title Page

In column 2 (page 1, item 56) at line 23, Under Other Publications, change "Sepetember" to --September--.

In column 2 (page 3, item 56) at line 55, Under Other Publications, change "Adhession" to --Adhesion--.

In the Specification

In column 4 at line 39, Delete "Dong Guan City, Guan Dong," and insert --DongGuan City, GuangDong,--.

In the Claims

In column 6 at line 59, In Claim 1, change "primary form" to --first mold--.
In column 6 at line 63, In Claim 2, change "primary form" to --first mold--.

Signed and Sealed this
Twenty-third Day of June, 2015

Michelle K. Lee
*Director of the United States Patent and Trademark Office*